United States Patent
Sun et al.

(10) Patent No.: US 11,431,233 B2
(45) Date of Patent: Aug. 30, 2022

(54) SYSTEM AND METHOD FOR WIRELESS POWER TRANSFER TO A ROTATING MEMBER IN A MOTOR

(71) Applicant: Rockwell Automation Technologies, Inc., Mayfield Heights, OH (US)

(72) Inventors: Xikai Sun, Shanghai (CN); Gennadi Sizov, Mequon, WI (US); Michael J. Melfi, Cleveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 411 days.

(21) Appl. No.: 16/585,297

(22) Filed: Sep. 27, 2019

(65) Prior Publication Data
US 2021/0099041 A1    Apr. 1, 2021

(51) Int. Cl.
| H02K 21/16 | (2006.01) |
| H02K 3/42  | (2006.01) |
| H02J 50/10 | (2016.01) |
| H02K 1/24  | (2006.01) |
| H02K 1/22  | (2006.01) |
| H02K 1/16  | (2006.01) |

(52) U.S. Cl.
CPC .............. *H02K 21/16* (2013.01); *H02J 50/10* (2016.02); *H02K 1/16* (2013.01); *H02K 1/223* (2013.01); *H02K 1/24* (2013.01); *H02K 1/246* (2013.01); *H02K 3/42* (2013.01)

(58) Field of Classification Search
CPC .......... H02J 50/001; H02J 50/10; H02K 1/16; H02K 1/223; H02K 1/24; H02K 1/246; H02K 19/10; H02K 21/16; H02K 3/42
See application file for complete search history.

(56) References Cited

U.S. PATENT DOCUMENTS

| 4,237,454 A    | 12/1980 | Meyer |
| 6,278,210 B1 * | 8/2001  | Fatula, Jr. .............. H01F 38/18 |
|                |         | 310/112 |
| 7,081,693 B2   | 7/2006  | Hamel et al. |
| (Continued) | | |

FOREIGN PATENT DOCUMENTS

| EP | 0286095 A1   | 10/1988 |
| JP | 4275614 B2 * | 6/2009  | ............. H02K 11/30 |

OTHER PUBLICATIONS

Ganchev et al.; "Rotor Temperature Distribution Measuring System"; dated 2011 IEEE pp. 2006-2011—(6) pages.

*Primary Examiner* — Naishadh N Desai
(74) *Attorney, Agent, or Firm* — Boyle Fredrickson, SC

(57) ABSTRACT

A system to reduce eddy currents and the resulting losses in a synchronous motor includes at least one pick-up coil mounted to the rotor. Each pick-up coil may be located proximate a pole on the rotor. A voltage applied to the stator to control the synchronous motor includes both a fundamental component and harmonic components. The fundamental component interacts with a magnetically salient structure in each pole on the rotor to cause rotation of the rotor. The harmonic components induce a voltage in the pick-up coil. The portion of the harmonic components that induce a voltage in the pick-up coil no longer generate eddy currents within the motor. The energy harvested by the pick-up coil may also be utilized in a function other than driving the motor, such as powering a sensor mounted on the rotor.

20 Claims, 7 Drawing Sheets

(56) References Cited

U.S. PATENT DOCUMENTS

| | | | |
|---|---|---|---|
| 8,841,785 B2 | 9/2014 | Theuss et al. | |
| 10,032,323 B2 | 7/2018 | Baker | |
| 2012/0313492 A1* | 12/2012 | Yamada | H02K 19/12 310/68 D |
| 2013/0334937 A1* | 12/2013 | Yamada | H02K 21/042 310/68 D |

* cited by examiner

SYSTEM AND METHOD FOR WIRELESS POWER TRANSFER TO A ROTATING MEMBER IN A MOTOR

BACKGROUND INFORMATION

The subject matter disclosed herein relates generally to harvesting energy transferred between a stator and a rotor in a rotating machine and, more specifically, to a system which utilizes a pick-up coil mounted on the rotor in a synchronous machine to harvest energy from harmonic content present in the stator of the machine.

As is known to those skilled in the art, a traditional synchronous machine utilizes a coil in the stator and a magnetic saliency in the rotor to control rotation of the motor. In a permanent magnet synchronous machine, magnets are mounted on the surface or embedded in the rotor and generate a magnetic field that interacts with an electromagnetic field generated by a controlled voltage applied to the coil in the stator. The controlled voltage has a variable magnitude and a variable frequency and generates the electromagnetic field which rotates within the motor according to the variable frequency to control rotation of the rotor.

As is also known to those skilled in the art, a motor drive is commonly used to generate the controlled voltage to be applied to the stator. The motor drive typically includes a DC bus on which a DC voltage is present and an inverter section in which power semiconductor devices are provided that selectively connect the DC voltage to an output of the motor drive. The motor drive further utilizes a modulation technique, such as pulse-width modulation (PWM), to control operation of the power semiconductor devices. The PWM generates an output voltage having a fundamental frequency corresponding to the desired rotational speed of the motor. Permanent magnet motors are commonly operated in a direct-drive configuration and the fundamental frequency may range from the tens of hertz to thousands of hertz. A switching frequency at which the PWM operates must be greater than, and preferably at least an order of magnitude greater than, the desired fundamental frequency at which the rotor is commanded to rotate. By varying the duration and polarity of DC voltage applied to the output within each period of the switching frequency, the desired fundamental frequency is approximated at the output of the motor drive.

The use of modulation in a motor drive, however, is not without certain drawbacks. While the largest component of the output voltage is a voltage at the fundamental frequency, additional components are present in the output voltage at the switching frequency and multiples, or harmonics, thereof. The current and voltage present at the fundamental frequency generate torque within and are the driving components of the motor. The current and voltage present at the harmonic frequencies induce undesirable eddy currents within the machine which, in turn, result in reduced performance or undesirable heat losses within the machine.

Thus, it would be desirable to provide a system to reduce the eddy currents and resultant losses in the motor.

It would also be desirable to utilize the energy present at the harmonic frequencies to perform a useful function rather than being dissipated as heat within the motor.

BRIEF DESCRIPTION

The subject matter disclosed herein describes a system to reduce the eddy currents and resultant losses in the motor. A pick-up coil is mounted to the rotor to reduce the undesirable losses resulting from the harmonic content present in the voltage applied to the synchronous machine from a motor drive. According to one embodiment of the invention, a pick-up coil is provided on the rotor for each pole of the synchronous machine. With respect to a permanent magnet synchronous machine, the pick-up coil may be wrapped around the magnets or within the slots for the permanent magnets in the rotor. Because the machine is a synchronous machine, the fundamental component of the voltage applied to the stator interacts only with the magnetically salient feature of the synchronous machine, such as the magnetic field generated by the permanent magnets in the permanent magnet machine, to cause rotation of the machine and does not interact with the pick-up coil provided in the rotor. As a result, the pick-up coil does not interfere with the desired operation of the machine. Rather, the pick-up coil interacts with the harmonic components of the voltage applied to the stator and has current and voltages induced within the pick-up coil as a result of the harmonic components present in the applied voltage. While a portion of the harmonic content in the applied voltage will still interact with the magnetic saliency, or magnetic field, and introduce undesirable eddy currents as a result, the portion of the harmonic components that interacts with the pick-up coil reduces the amplitude of the undesirable eddy currents, thereby improving performance of the synchronous machine.

The energy harvested by the pick-up coil may also be utilized to perform a useful function rather than being dissipated as heat within the motor. After harvesting the harmonic content, the current and voltages induced in the pick-up coil may be connected to another circuit and serve as a supply voltage for the other circuit. In the first instance, a resistive load may be connected to the pick-up coil. The resistive load will dissipate the energy from the pick-up coil as heat. However, the load may be mounted, for example, at the output end of the motor, which is typically the opposite end to which an encoder is mounted such that the heat does not adversely affect other components mounted to the motor. Alternately, the rotor may have an electronic device, such as a sensor mounted on the rotor. The sensor may measure an operating condition within the motor such as the temperature or vibration present on the rotor. The energy harvested by the pick-up coil allows for wireless delivery of power to a device on a rotating surface, it is also contemplated that an inductive-capacitive circuit may also be connected to the pick-up coil to establish a resonance at one or more frequencies at which harmonic content is present in the stator to maximize power transfer to the pick-up coil.

According to one embodiment of the invention, a system for wireless power transfer to a rotating member in a motor is disclosed. The system includes a stator and a rotor operatively mounted to the stator. At least one winding is wound on the stator, and the at least one winding is configured to receive an alternating current (AC) voltage, where the AC voltage includes at least a fundamental component and a harmonic component. Multiple poles are included within the rotor, where each pole includes a magnetically salient structure. At least one pick-up coil is mounted to the rotor. When the AC voltage is provided to the at least one winding, the fundamental component of the AC voltage generates an electromagnetic field which engages the magnetically salient structure in each pole to cause rotation of the rotor, and the harmonic component of the AC voltage generates an electromagnetic field which induces a voltage in the at least one pick-up coil.

According to another embodiment of the invention, a system for reducing losses in a synchronous motor is disclosed. The system includes a stator and a rotor operatively connected to the stator. A winding for each phase of the synchronous motor is wound on the stator and is configured to receive an alternating current (AC) voltage corresponding to that phase, where the AC voltage includes a fundamental component and at least one harmonic component. Multiple poles are included within the rotor. Each pole includes a magnetically salient structure operative to engage an electromagnetic field generated by the AC voltage applied to the winding for each phase of the synchronous motor and to cause rotation of the rotor responsive to the electromagnetic field. At least one pick-up coil is mounted to the rotor. Each harmonic component in the AC voltage generates an electromagnetic field that, at least in part, is coupled to the at least one pick-up coil, and the part of the electromagnetic field that is coupled to the pick-up coil induces a voltage in the pick-up coil rather than generating losses in the synchronous motor.

According to yet another embodiment of the invention, a method for wireless power transfer to a rotating member in a synchronous motor is disclosed. A first alternating current (AC) voltage to is provided a coil mounted on a fixed member of the synchronous motor, where the first AC voltage includes at least a fundamental component and a harmonic component. Rotation of a rotating member in the motor is caused responsive to providing the first AC voltage. The AC voltage generates an electromagnetic field operative to engage a pole on the rotating member. A second AC voltage is induced in a pick-up coil mounted on the rotating member, where the second AC voltage is induced from the harmonic component of the first alternating current voltage.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
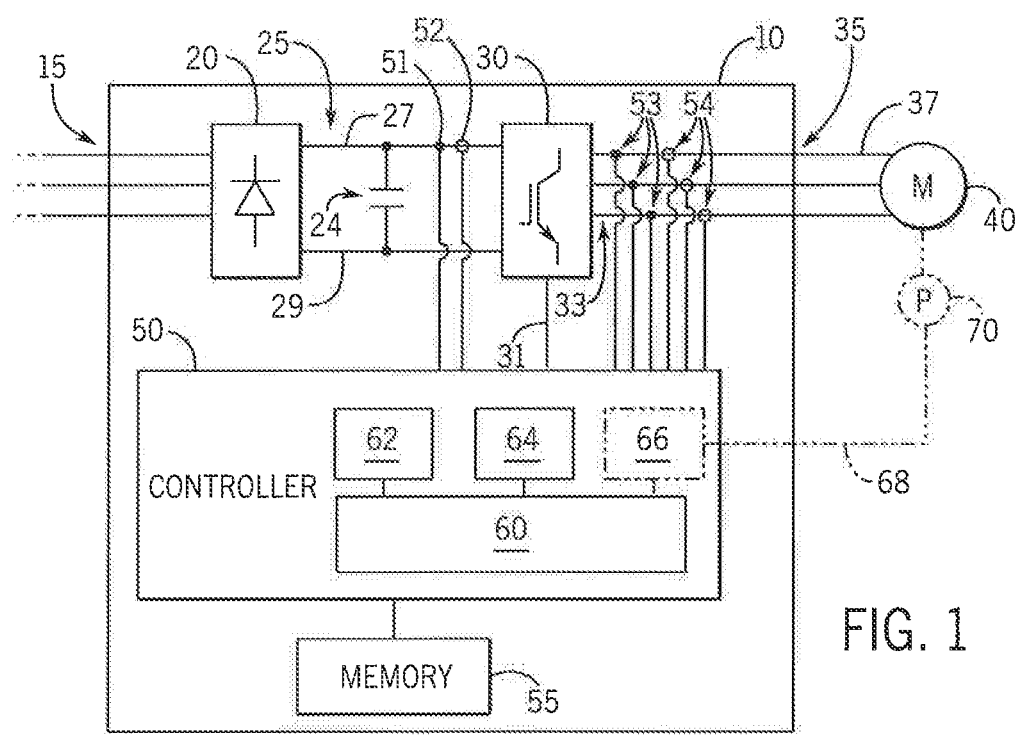
FIG. 1 is a partial schematic representation of an exemplary motor drive and motor incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary motor drive 10 operative to control a synchronous motor 40 is configured to receive a three-phase AC voltage at an input 15 of the motor drive 10 which is, in turn, provided to a rectifier section 20 of the motor drive 10. The rectifier section 20 may include any electronic device suitable for passive or active rectification as is understood in the art. The rectifier section 20 may include, for example, a set of diodes forming a diode bridge that rectifies the three-phase AC voltage to a DC voltage on a DC bus 25. Optionally, the rectifier section 20 may include other solid-state devices including, but not limited to, thyristors, silicon-controlled rectifiers (SCRs), or transistors to convert the input power 15 to a DC voltage for the DC bus 25. The DC voltage is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the DC voltage between the negative and positive rails, 29 and 27, is generally equal to the magnitude of the peak of the AC input voltage.

The DC bus 25 is connected in series between the rectifier section 20 and an inverter section 30. The inverter section 30 consists of switching elements, such as transistors, thyristors, or SCRs as is known in the art. According to one embodiment of the invention, the inverter section 30 includes an insulated gate bipolar transistor (IGBT) and a free-wheeling diode connected in pairs between the positive rail 27 and each phase of the output voltage as well as between the negative rail 29 and each phase of the output voltage. According to another embodiment of the invention, the inverter section 30 includes metal-oxide semiconductor field-effect transistors (MOSFETs) connected in pairs between the positive rail 27 and each phase of the output voltage as well as between the negative rail 29 and each phase of the output voltage. The body diode inherent in the MOSFET provides a reverse conduction path in a manner similar to the free-wheeling diode provided for an IGBT. Each of the IGBTs or MOSFETs receives gating signals 31 to selectively enable the transistors and to convert the DC voltage from the DC bus 25 into a controlled three phase output voltage to the motor 40. When enabled, each transistor connects the respective rail 27, 29 of the DC bus 25 to an electrical conductor 33 connected between the transistor and the output terminal 35. The electrical conductor 33 is selected according to the application requirements (e.g., the rating of the motor drive 10) and may be, for example, a conductive surface on a circuit board to which the transistors 32 are mounted or a bus bar connected to a terminal from a power module in which the transistors 32 are contained. The output terminals 35 of the motor drive 10 may be connected to the motor 40 via a cable 37 including electrical conductors connected to each of the output terminals 35.

A controller 50 includes multiple modules (60-66) and manages execution of the modules to achieve a desired operation of the motor 40. One or more modules (60-66) are used to control operation of the motor drive 10. The modules may include, but are not limited to, a current regulator, a voltage regulator, a feedback module, a position regulator, or a modulation module. The illustrated embodiment is not intended to be limiting and it is understood that various features of each module discussed herein may be executed by another module and/or various combinations of other modules may be included in the controller 50 without deviating from the scope of the invention. The modules may be stored programs executed on one or more processors, logic circuits, or a combination thereof. The controller 50 may be implemented, for example, in a microprocessor, application specific integrated circuit (ASIC), field programmable gate array (FPGA), or other such customizable device. The motor drive 10 also includes a memory device 55 in communication with the controller 50. The memory device 55 may include transitory memory, non-transitory memory or a combination thereof. The memory device 55 may be configured to store data and programs, which include a series of instructions executable by the controller 50. It is contemplated that the memory device 55 may be a single device, multiple devices, or incorporated, for example, as a portion of another device such as an application specific integrated circuit (ASIC). The controller 50 is in communication with the memory 55 to read the instructions and data as required to control operation of the motor drive 10.

The controller 50 also receives feedback signals indicating the current operation of the motor drive 10. The motor drive 10 may include a voltage sensor 51 and/or a current sensor 52 on the DC bus 25 generating a feedback signal corresponding to the magnitude of voltage and/or current present on the DC bus 25. The motor drive 10 may also include one or more voltage sensors 53 and/or current sensors 54 on the output phase(s) of the inverter section 30 generating a feedback signal corresponding to the magnitude of voltage and/or current present on the electrical conductors 33 between the inverter section 30 and the output 35 of the motor drive. The controller 50 includes components required to convert the signals, such as analog to digital (A/D) converters, buffers, amplifiers, and any other components that would be necessary to convert a feedback signal in a first format to a signal in a second format suitable for use by the controller 50 as would be understood in the art.

Figure 2:
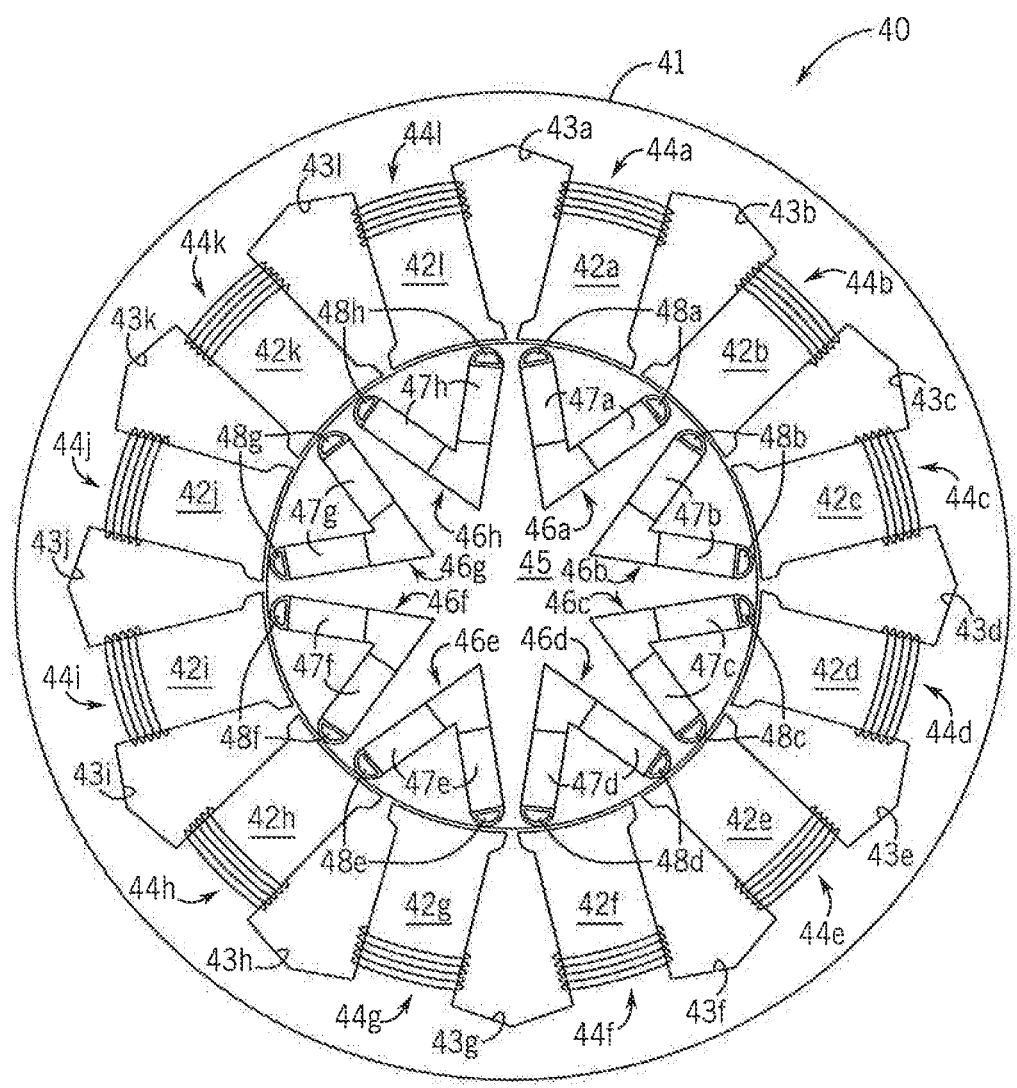
FIG. 2 is a sectional view of a motor according to one embodiment of the invention illustrating a pick-up coil wound in slots of an interior permanent magnet motor.
Figure 3:
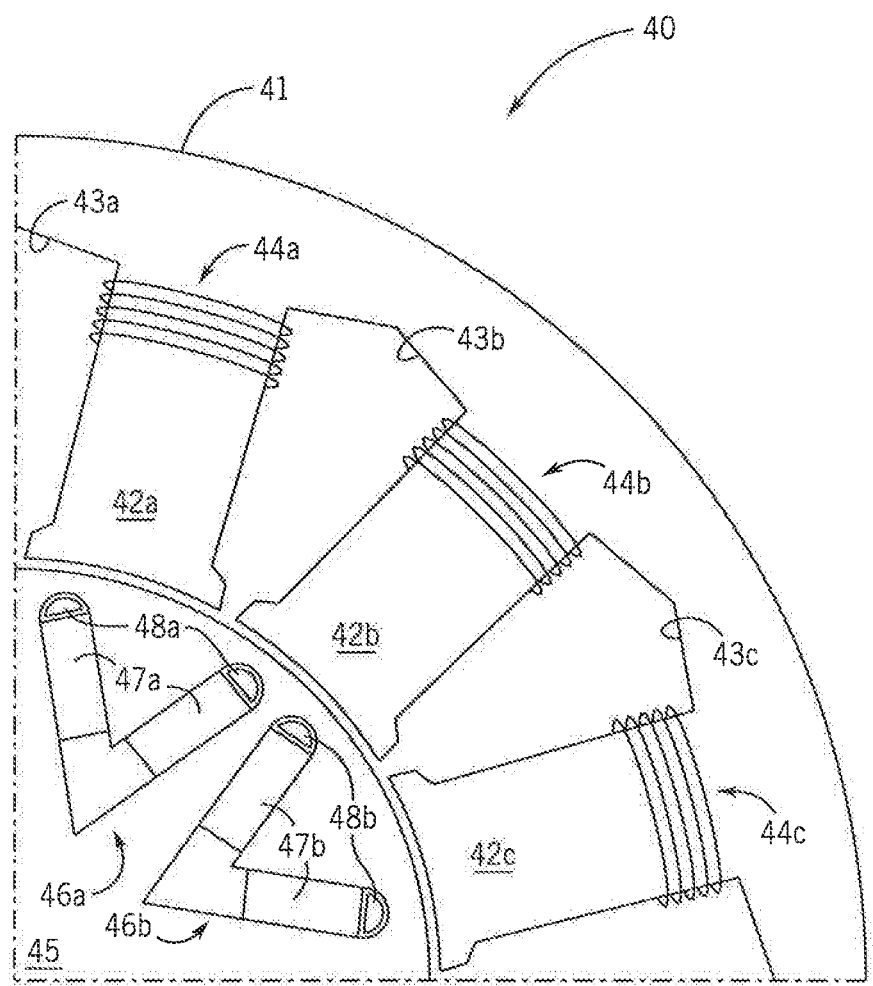
FIG. 3 is a partial sectional view of the motor of FIG. 2.

Turning next to FIGS. 2 and 3, one embodiment of a synchronous motor 40 controlled by the motor drive 10 is a permanent magnet (PM) motor. The PM motor 40 includes a rotor 45 having a number of poles 46 and a stator 41 having a number of windings 44. According to the illustrated embodiment, the PM motor 40 includes twelve windings 44a-44l and eight poles 46a-46h. As is understood in the art, each winding 44 is wound around a tooth 42 with the windings filling slots 43 between adjacent teeth 42. Each winding 44 consists of a number of turns, N, wrapped around the tooth 42. The PM motor 40 shown in FIGS. 2 and 3 is an interior permanent magnet motor, and each pole 46 includes a v-shaped slot in which a pair of magnets 47 is inserted, where one magnet of the pair is inserted into each leg of the v-shaped slot. Optionally, each pole 46 may include a bar magnet and a single slot. It is contemplated that the slots may take various other shapes and be configured to receive magnets 47 having a complementary shape to be inserted within the slot without deviating from the scope of the invention.

Each slot also includes a portion of a pick-up coil 48 located within the slot. According to the illustrated embodiment, each pick-up coil 48 is wound at the end of each v-shaped slot between the magnet 47 and the outer periphery of the rotor 45. Each pick-up coil 48 may have a number of turns, where the coil is would in one direction through one end of the v-shaped slot, wound in the other direction through the other end of the v-shaped slot, and includes end-turns at each end of the rotor 45. Optionally, the rotor 45 may include a first slot in which the magnet 47 is inserted and a second slot configured to receive the pick-up coil 48. According to another embodiment, the rotor 45 may include a number of grooves or channels extending longitudinally along the length of the rotor 45 in which each of the pick-up coils 48 is received.

Figure 4:
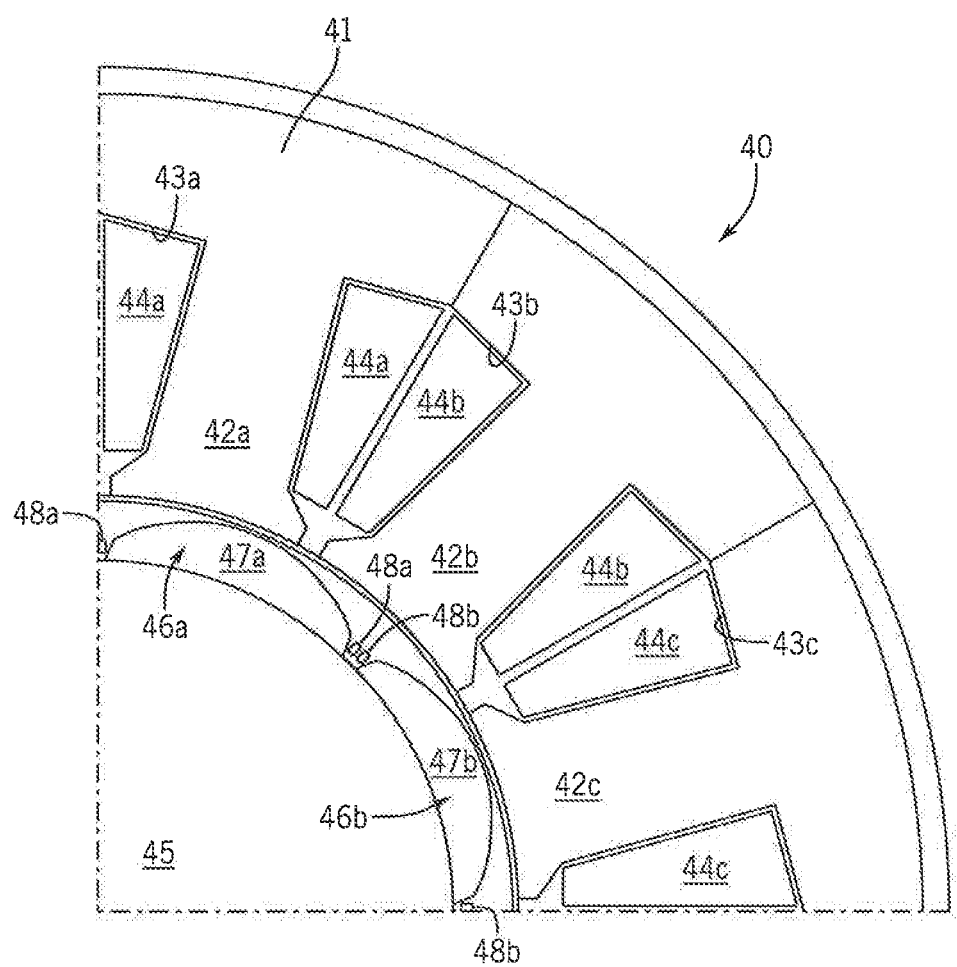
FIG. 4 is a partial sectional view of a motor according to another embodiment of the invention illustrating a pick-up coil wound around magnets in a surface permanent magnet motor.

Turning next to FIG. 4, another embodiment of the PM motor 40 controlled by the motor drive 10 is illustrated. The PM motor 40 includes a rotor 45 having a number of poles 46 and a stator 41 having a number of windings 44. As is understood in the art, each winding 44 is wound around a tooth 42 with the windings filling slots 43 between adjacent teeth 42. Each winding 44 consists of a number of turns, N, wrapped around the tooth 42. The PM motor 40 shown in FIG. 4 is a surface permanent magnet motor, and each pole 46 includes a shaped magnet 47 mounted to an outer periphery of the rotor 45. It is contemplated that the magnets 47 may take various other shapes and each pole may have multiple magnets 47 without deviating from the scope of the invention.

According to the embodiment illustrated in FIG. 4, each pick-up coil 48 is also located on the outer periphery of the rotor 45. Each pick-up coil 48 is wound around one of the magnets 47, where the coil is wound in one direction along one side of the magnet 47 and wound in the other direction along the other side of the magnet 47. Each pick-up coil 48 may have a number of turns. Optionally, the rotor 45 may include a number of grooves or channels extending longitudinally along the length of the rotor 45 in which each of the pick-up coils 48 is received.

Figure 5:
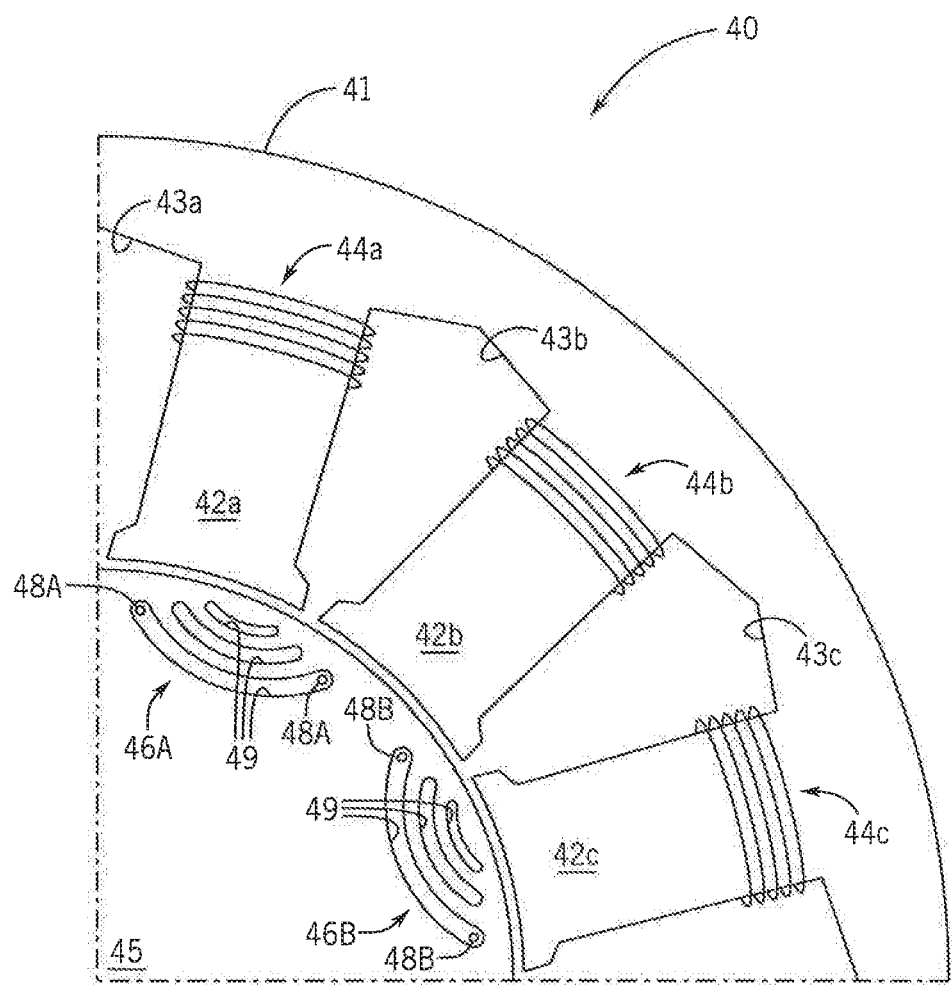
FIG. 5 is a partial sectional view of a motor according to another embodiment of the invention illustrating a pick-up cod wound within slots of a synchronous reluctance motor.

According to the embodiment illustrated in FIG. 5, each pick-up coil 48 is located proximate one end of the inner slot 49 for each pole 46. Each pick-up coil 48 is wound within the slot, where the coil is would in one direction proximate one end of the slot and wound in the other direction proximate the other end of the slot. Each pick-up coil 48 may have a number of turns. Further, multiple pick-up coils 48 may be provided for each pole with, for example, a separate pick-up coil wound in each slot. According to still another embodiment, a single pick-up coil 48 may be established by serially connecting windings in multiple slots.

For convenience of description, operation of the system with respect to a PM motor 40 will be discussed. However, it is understood that various other synchronous motors incorporating a pick-up coil 48, as discussed above, may be utilized.

In operation, the motor drive 10 receives a reference signal, such as a speed reference, position reference, or a torque reference corresponding to desired operation of the PM motor 40 and regulates the amplitude and frequency of current and/or voltage supplied to the PM motor 40 to achieve the desired operation of the PM motor 40. In one embodiment of the invention, the controller 50 includes a current regulator module (not shown) to control the current provided to the PM motor 40. The controller uses the current values measured at the output 35 of the motor drive 10 by the current sensors 54. As is understood in the art, Park's transformation may be used to convert the measured three-phase currents into a two-phase representation of the current along a quadrature axis (q-axis) and along a direct axis (d-axis). The q-axis current corresponds to the amount of torque produced by the PM motor 40 and the d-axis current corresponds to the flux established between the rotor and the stator in the motor. The magnitude of flux is a function of the field strength of the permanent magnets 47 in the rotor 45, of the windings 44 in the stator 41, and of the tooth 42 and/or slot 43 shape in the stator 41.

Turning next to FIG. 5, still another embodiment of a synchronous motor 40 controlled by the motor drive 10 is illustrated. The synchronous motor 40 in FIG. 5 is a synchronous reluctance motor including a rotor 45 having a number of poles 46 and a stator 41 having a number of windings 44. As is understood in the art, each winding 44 is wound around a tooth 42 with the windings filling slots 43 between adjacent teeth 42. Each winding 44 consists of a number of turns, N, wrapped around the tooth 42. Each pole 46 of the synchronous reluctance motor includes a magnetically salient structure that will be magnetically attracted to rotating electromagnetic field. The magnetically salient structure may include a number of protrusions extending radially outward from a center axis of the rotor. Alternately, material may be removed from each rotor lamination, forming slots 49 or voids within a rotor having a generally circular periphery. Either the protrusion or void establishes a non-uniform magnetic cross-section, or a magnetically salient structure, in the rotor 45. In the embodiment illustrated in FIG. 5, each pole 46 includes a series of three arcuate slots 49 positioned adjacent to each other along the are of each slot. It is contemplated that various configurations of slots 49, protrusions, or a combination thereof may be utilized to define each pole 46 within a synchronous reluctance motor without deviating from the scope of the invention.

Figure 6:
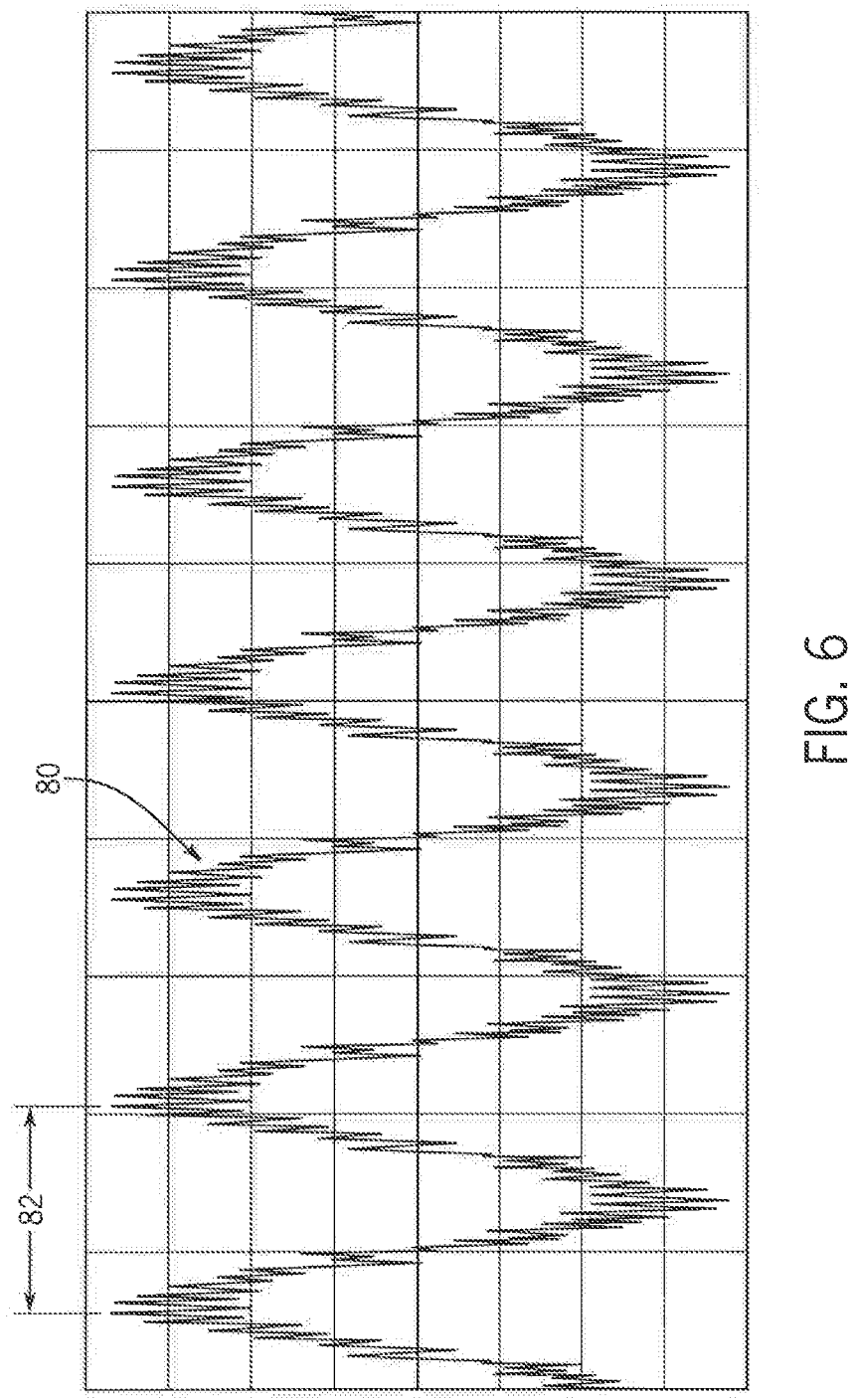
FIG. 6 is a graphical representation of a current supplied to one phase of a synchronous motor.

Turning next to FIG. 6, an exemplary waveform 80 of current supplied to the stator 41 of the motor 40 from the motor drive 10 is illustrated. The period 82 of one cycle of the fundamental frequency is indicated, and it may be observed that the magnitude of the fundamental component of the current dominates the waveform 80. Harmonic components present in the current waveform 80 generate the ripple current present on top of the fundamental component. This current is an exemplary current that may result in the stator winding 44 when a PWM voltage waveform is applied to the motor 40.

The frequency of the fundamental component of current applied to the motor 40 determines the speed at which the motor 40 rotates. The current in the stator winding 44 generates a rotating electromagnetic field within the motor 40, where the speed at which the electromagnetic field rotates around the motor 40 is a function of the frequency of the current and of the number of poles within the motor 40. The magnets 47 in the rotor 45 of the motor 40 establish a constant magnetic field. The rotating electromagnetic field resulting from the current applied to the stator interacts with the constant magnetic field of the rotor to cause rotation of the motor 40.

While the speed of the motor 40 is controlled by the fundamental component of the current, the harmonic components also effect operation of the motor 40. Each component of the current (i.e., fundamental and harmonic) create rotating electromagnetic fields within the motor 40 as a function of the frequency of the respective component. Because the amplitude of the fundamental component is significantly greater than the amplitude of any of the harmonic components, the rotating electromagnetic field generated by the fundamental component dominates performance and engages the magnetic field produced by the magnets 47 to control operation of the motor. The other rotating electromagnetic fields, however, still exert a force on the magnetic field produced by the magnets 47 and can cause a ripple torque on the rotor 45 corresponding to the ripple current observed on the current waveform 80. Additionally, the rotating electromagnetic fields of the harmonic components may establish eddy currents in the magnets 47 themselves, which, in turn, are dissipated as heat losses in the magnets 47.

The pick-up coil 48 mounted to the rotor 45 reduces the ripple current and eddy currents generated by the harmonic components in the current. When a coil is present in a rotating electromagnetic field, a voltage is induced in the coil. Because the rotor 45 rotates synchronously with the fundamental component of the current, the pick-up coil 48 mounted to the rotor 45 experiences no rotational electromagnetic field from the fundamental component. The electromagnetic fields generated by the harmonic components, however, rotate at frequencies other than the fundamental frequency, and the pick-up coil 48 mounted to the rotor experiences a rotating electromagnetic field, where the frequency of rotation of the rotating electromagnetic field, as experienced by the pick-up coil 48 is the difference between the frequency of the harmonic component and the fundamental component. These rotating electromagnetic fields experienced by the pick-up coil 48 induce a voltage in the pick-up coil. Further, the energy used to generate the voltage in the pick-up coil 48 is no longer available to generate a ripple torque on the motor or an eddy current within the magnets 47 of the motor.

Figure 7:
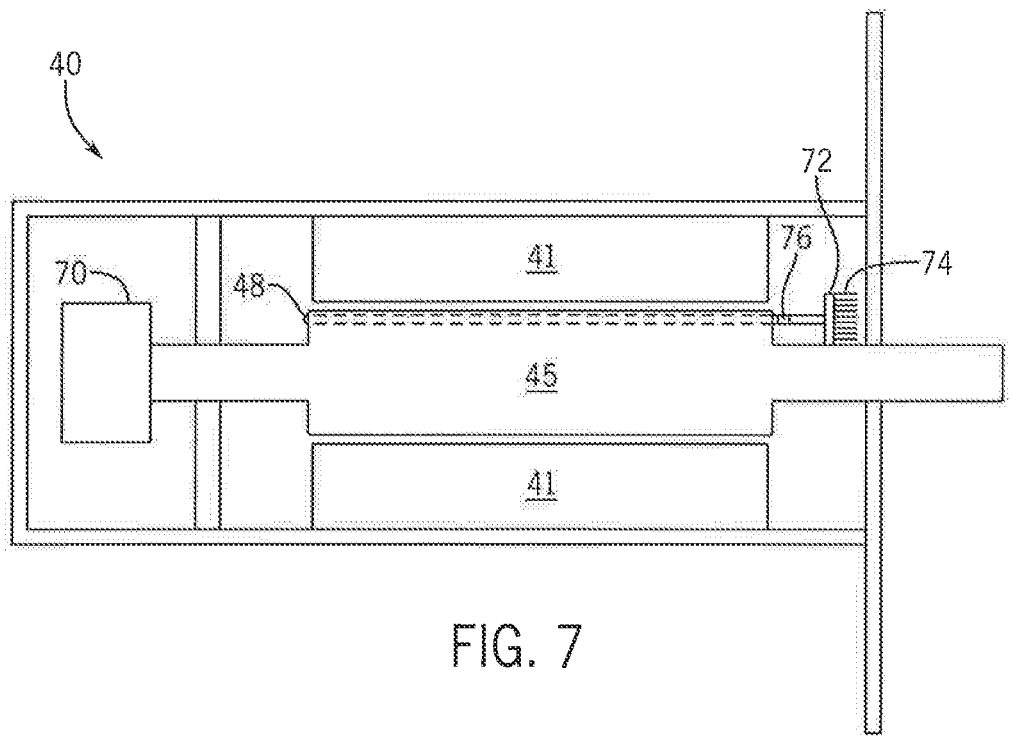
FIG. 7 is a sectional view of a motor including a capacitor and resistive load coupled to the pick-up coil.

According to a first embodiment of the invention, it is contemplated that the pick-up coil 48 may be used to reduce the undesirable effects of the harmonic content on the motor 40. Turning next to FIG. 7, the pick-up coil 48 may be connected to a resistive load 72. For a purely resistive load, the voltage induced in the pick-up coil 48 is dissipated in the load 72 as heat and a resultant current flows through the pick-up coil 48 as defined by Ohm's law. Because energy is dissipated in a resistive load 72 as heat, the resistive load 72 may be mounted to a heat sink 74 within the motor. The resistive load 72 and heat sink 74 may be located within the motor 40 at a desirable location in which to dissipate heat. According to the illustrated embodiment, the resistive load 72 and heat sink 74 are mounted proximate the output end of the motor. The output end of the motor is commonly mounted to a drive train or directly to a controlled object, such that a substantial physical element, such as a gearbox, lead screw, pulley, or the like is secured to the face of the motor 40, providing a path for thermal transfer of the heat away from the motor 40. Additionally, an encoder 70, when present, is typically located at the opposite end of the motor 40 from the output end. Positioning the resistive load 72 and the heat sink at the output end moves the heat dissipation away from the encoder 70.

Although illustrated in FIG. 7 in block diagram form as being positioned on one side of the rotor 45, it is contemplated that the resistive load 72 may be a single resistor or multiple resistors connected in series, parallel, or a combination thereof. It is further contemplated that the resistors may be mounted, for example, on a substrate with a hole passing through the substrate such that the substrate may slide over and be mounted to the shaft of the rotor extending through the output side of the motor 40. Similarly, the heat sink 74 may be a single heat sink, multiple heat sinks, or a continuous heat sink mounted to the substrate or directly to the shaft of the rotor 45 and the resistive load 72 mounted to the heat sink 74. Optionally, if a single resistive load 72 and heat sink 74 are mounted to one side of the rotor 45, it is contemplated that a weight may be mounted to an opposite side of the rotor 45 to balance the rotor 45 and minimize vibration on the shaft of the motor 40 as a result of an imbalance on the rotor 45.

It is further contemplated that a capacitive element 76 may be operatively connected to the pick-up coil 48. The capacitive element 76 may be a single capacitor or multiple capacitors connected in series, parallel, or a combination thereof. The inductive nature of the pick-up coil 48 in combination with the capacitive element 76 forms an L-C circuit. The inductance and capacitance values may be selected to establish a resonance in the L-C circuit at a frequency that is coincident with the frequency of one of the harmonic components. The resonance will increase the efficiency and capacity of power transfer between the electromagnetic field established by the corresponding harmonic component and the pick-up coil 48. Optionally, an additional inductor may also be connected with the pick-up coil 48 and the capacitive element 76 to obtain a desired resonance from the L-C circuit. Increasing the capacity of power transfer from the electromagnetic field established by the corresponding harmonic component to the pick-up coil 48 further reduces the power remaining in the electromagnetic field that may produce an undesirable effect such as eddy currents in the motor 40.

Figure 8:
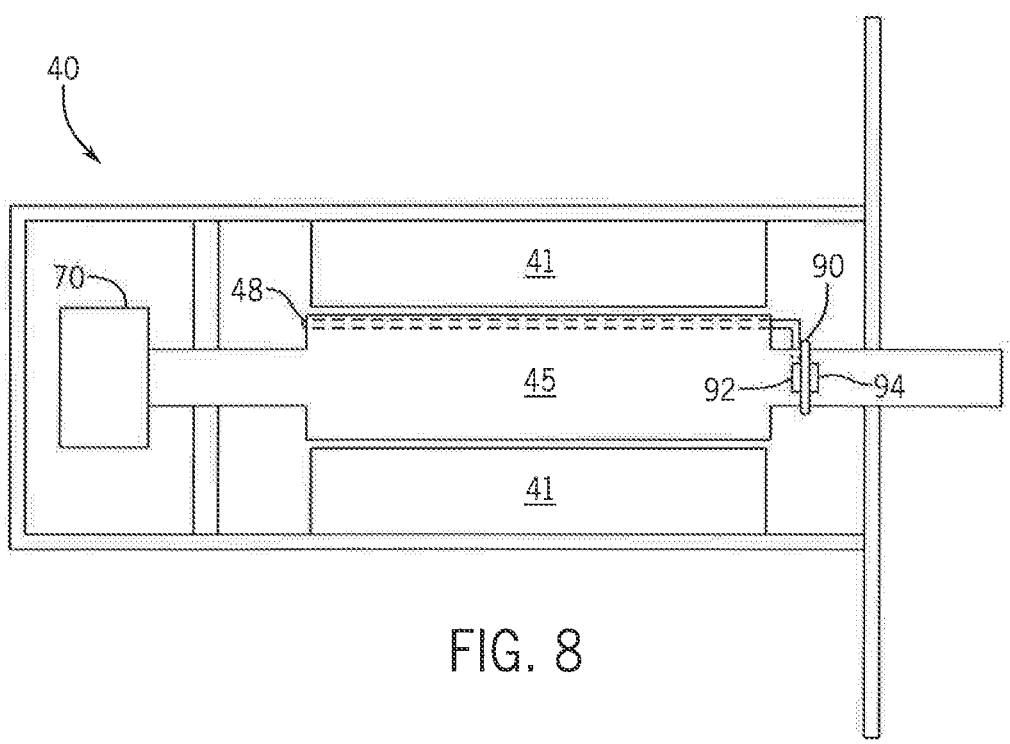
FIG. 8 is a sectional view of a motor including a sensor mounted on the rotor, where the sensor is powered by voltage induced in the pick-up coil.

According to a second embodiment of the invention, it is contemplated that the pick-up coil 48 may be connected to a circuit 92 mounted on the rotor 45 and serves as a wireless power source for the circuit. With reference next to FIG. 8, a circuit board 90 has a generally circular form with an opening extending through the center and is mounted on the rotor 45. A circuit 92, illustrated as a single block mounted to one side of the circuit board 90 may include multiple electronic components according to an application's requirements. The circuit 92 may include a power converter configured to receive the AC voltage induced on the pick-up coil 48 as an input and to provide a second voltage as an output. The power converter may include, for example, diodes arranged as a passive rectifier to convert the AC voltage to a DC voltage. The power converter may also include a capacitance connected to the output of the passive rectifier in order to reduce a ripple present on the DC voltage from rectification. Optionally, a voltage regulator may be included in the circuit 92, where the voltage regulator may be configured to receive the rectified DC voltage and supply a constant DC voltage output for use by other devices either in the circuit 92 or for a sensor 94 mounted on the rotor 45.

A sensor 94 is illustrated on the opposite side of the circuit board 90. It is contemplated that the sensor 94 may be mounted directly to the rotor 45 or to the circuit board 90. The sensor may detect any operating condition as required by the application requirements including, but not limited to, torque, temperature, or vibration, within the motor or directly on the rotor. The sensor 94 generates a feedback signal corresponding to the measured operating condition.

The feedback signal corresponding to the measured operating condition may then be communicated outside of the motor 40. The circuit 92 may include, for example, a wireless transmitter or transceiver operative to transmit the feedback signal to a receiver or second transceiver mounted on a fixed member of the motor 40 or mounted external to the motor 40. The transmitter may communicate via a radio frequency (RF) signal, infrared signal, or via any other wireless communication medium and as would be understood in the art.

It is contemplated that the feedback signal may only need to be transmitted at periodic intervals. In order to conserve power on the rotor 45, the circuit 92 may include a clock circuit that is continually powered, however, the sensor and the transmitter may be periodically energized to sample the desired operating condition, generate a feedback signal, and transmit the feedback signal. It is further contemplated that the circuit 92 may include an energy storage device, such as a storage capacitor or battery to store energy received at the pick-up coil 48 during the intervals between activating the sensor 94 and/or transmitter mounted to the rotor 45. Thus, the circuit 92 may store energy during periods of time when the energy received via the pick-up coil 48 exceeds the energy required by the circuit 92 and draw from the stored energy during periods of time when the energy received via the pick-up coil 48 is less than the energy required by the circuit 92. The energy harvested by the pick-up coil 48 may provide for advanced analytics, condition monitoring, or safety applications to be incorporated on the rotating member of the motor via the wireless power transfer between the stator 41 and the pick-up coil 48.

According to another aspect of the invention, the wireless power transfer between the stator 41 and the pick-up coil may provide for improved operation of the permanent magnet motor 40. It is known that the flux linkage of the magnets in the motor varies as a function of temperature. However, it has previously not been possible to obtain a measurement of temperature of the magnets on the rotating member of the motor 40. Rather, a constant value of flux linkage has been utilized by a motor controller 10 for controlling operation of the motor 40. A temperature sensor 94 may be provided on the rotor 45 to measure the temperature of the magnets 47 in the motor. A feedback signal, corresponding to the measured temperature may be transmitted back to the motor controller 10. The motor controller 10 may include, for example, a look-up table storing values of the flux linkage for the motor 40 at different temperatures. The value corresponding to the measured temperature may be utilized by the motor controller 10 for improved control and improved operation of the motor 40.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for wireless power transfer in a motor having a stator and a rotor, the system comprising:
   at least one winding wound on the stator, wherein the at least one winding is configured to receive an alternating current (AC) voltage, the AC voltage including at least a fundamental component and a harmonic component;
   a plurality of poles in the rotor, wherein each pole includes a magnetically salient structure;
   an electrical circuit mounted on the rotor; and
   at least one pick-up coil mounted to the rotor, wherein, when the AC voltage is provided to the at least one winding:
      the fundamental component of the AC voltage generates an electromagnetic field which engages the magnetically salient structure in each pole to cause rotation of the rotor,
      the harmonic component of the AC voltage generates an electromagnetic field which induces a voltage in the at least one pick-up coil, and
      the electrical circuit is connected to and provides a load for the at least one pick-up coil, receiving the voltage induced in the at least one pick-up coil as a supply voltage to the electrical circuit.

2. The system of claim 1 wherein:
   the magnetically salient structure in each pole is at least one permanent magnet,
   each permanent magnet emits a magnetic field, and
   the electromagnetic field generated by the fundamental component of the AC voltage engages the magnetic field from each permanent magnet to cause rotation of the rotor.

3. The system of claim 1 wherein the magnetically salient structure of each pole includes at least one of a projection from the rotor and a void within the rotor.

4. The system of claim 1 further comprising:
   a motor controller operative to provide the AC voltage to the at least one winding, wherein:
      the motor controller uses a modulation technique to generate the AC voltage,
      the AC voltage includes a plurality of harmonic components, and
      each of the plurality of harmonic components induces a voltage in the at least one pick-up coil.

5. The system of claim 1 further comprising a capacitive load mounted on the rotor and operatively connected to the at least one pick-up coil.

6. The system of claim 1 further comprising:
   a heat sink mounted on the rotor; and
   a resistive load mounted on the heat sink.

7. The system of claim 1 further comprising an energy storage device operatively connected to the pick-up coil.

8. The system of claim 1 wherein the electrical circuit includes a power converter mounted on the rotor, wherein the power converter receives the voltage induced in the at least one pick-up coil as an input and outputs a second voltage different from the voltage received as the input.

9. The system of claim 8 wherein the voltage induced in the at least one pick-up coil is a second AC voltage and the second voltage output from the power converter is a DC voltage.

10. The system of claim 9 further comprising:
    a voltage regulator operative to receive the DC voltage as an input and to supply a constant DC voltage as an output, wherein the electrical circuit further includes at least one electrical device mounted on the rotor and operatively connected to the output of the voltage regulator, wherein the at least one electrical device is powered by the constant DC voltage.

11. A system for reducing losses in a synchronous motor, having a stator and a rotor, the system comprising:
    a winding for each phase of the synchronous motor wound on the stator, wherein the winding for each phase is configured to receive an alternating current (AC) voltage corresponding to that phase and wherein the AC voltage includes a fundamental component and at least one harmonic component;
    a plurality of poles in the rotor, wherein each pole includes a magnetically salient structure operative to engage an electromagnetic field generated by the AC voltage applied to the winding for each phase of the synchronous motor and to cause rotation of the rotor responsive to the electromagnetic field;
    at least one pick-up coil mounted to the rotor, and
    an electrical circuit mounted on the rotor and connected to the at least one pick-up coil, wherein:
       the at least one harmonic component in the AC voltage generates an electromagnetic field that, at least in part, is coupled to the at least one pick-up coil,
       the part of the electromagnetic field that is coupled to the at least one pick-up coil induces a voltage in the at least one pick-up coil rather than generating losses in the synchronous motor, and
       the electrical circuit provides a load for the at least one pick-up coil, receiving the voltage induced in the at least one pick-up coil as a supply voltage.

12. The system of claim 11 wherein:
    the magnetically salient structure in each pole is at least one permanent magnet,
    each permanent magnet emits a magnetic field, and
    the electromagnetic field generated by the fundamental component of the AC voltage engages the magnetic field from each permanent magnet to cause rotation of the rotor.

13. The system of claim 11 wherein the magnetically salient structure of each pole includes at least one of a projection from the rotor and a void within the rotor.

14. The system of claim 11 further comprising a capacitive load mounted on the rotor and operatively connected to the at least one pick-up coil.

15. A method for wireless power transfer in a synchronous motor having a stator and a rotor, the method comprising the steps of:
    providing a first alternating current (AC) voltage to a coil mounted on a fixed member of the synchronous motor, wherein the first AC voltage includes at least a fundamental component and a harmonic component;
    causing rotation of a rotating member in the motor responsive to providing the AC voltage, wherein the first AC voltage generates an electromagnetic field operative to engage a pole on the rotating member;
    inducing a second AC voltage in a pick-up coil mounted on the rotating member, wherein the second AC voltage is induced from the harmonic component of the first alternating current voltage; and
    providing the second AC voltage as a supply voltage to an electrical circuit mounted on the rotating member wherein the electrical circuit is a load for the pick-up coil.

16. The method of claim 15 wherein:
    each pole on the rotating member includes at least one permanent magnet, and the electromagnetic field generated by the AC voltage engages a magnetic field emitted by the at least one permanent magnet in each pole to cause rotation of the rotating member.

17. The method of claim 15 further comprising the step of:
generating the first AC voltage in a motor controller operatively connected to the coil on the fixed member of the synchronous motor, wherein:
the motor controller uses a modulation technique to generate the first AC voltage,
the first AC voltage includes a plurality of harmonic components, and
each of the plurality of harmonic components induces at least a portion of the second AC voltage in the pick-up coil.

18. The method of claim 15 further comprising the step of providing a capacitive load mounted on the rotating member, wherein a value of the capacitive load is selected in combination with a value of inductance in the pick-up coil to amplify the second AC voltage induced in the pick-up coil.

19. The method of claim 15 further comprising the step of supplying the second AC voltage to a resistive load mounted on the rotating member, wherein the resistive load is in the electrical circuit.

20. The method of claim 15 further comprising the steps of:
regulating the second AC voltage to a uniform voltage; and
enabling operation of at least one electrical device mounted in the electrical circuit with the uniform voltage.

* * * * *